US009640974B2

United States Patent
Abplanalp et al.

(10) Patent No.: US 9,640,974 B2
(45) Date of Patent: May 2, 2017

(54) PASSIVE RESONANCE DC CIRCUIT BREAKER

(71) Applicant: ABB Schweiz AG, Baden (CH)

(72) Inventors: Markus Abplanalp, Baden Dattwil (CH); Rudolf Gati, Niederrohrdorf (CH)

(73) Assignee: ABB Schweiz AG, Baden (CH)

( * ) Notice: Subject to any disclaimer, the term of this patent is extended or adjusted under 35 U.S.C. 154(b) by 122 days.

(21) Appl. No.: 14/513,939

(22) Filed: Oct. 14, 2014

(65) Prior Publication Data

US 2015/0029617 A1 Jan. 29, 2015

Related U.S. Application Data

(63) Continuation of application No. PCT/EP2012/056763, filed on Apr. 13, 2012.

(51) Int. Cl.
*H02H 3/087* (2006.01)
*H01H 33/08* (2006.01)
(Continued)

(52) U.S. Cl.
CPC ............ *H02H 3/087* (2013.01); *H01H 33/08* (2013.01); *H01H 33/596* (2013.01);
(Continued)

(58) Field of Classification Search
CPC .. H01H 33/08–33/10; H01H 33/664–33/6641; H02H 3/08; H02H 3/087
(Continued)

(56) References Cited

U.S. PATENT DOCUMENTS 2,849,659 A 8/1958 Kesselring
4,216,513 A * 8/1980 Tokuyama ........... H01H 33/596
361/13
(Continued)

FOREIGN PATENT DOCUMENTS

GB 991926 A 5/1965
WO 2009149749 A1 12/2009

OTHER PUBLICATIONS

International Search Report & Written Opinion Application No. PCT/EP2012/056763 Completed: Dec. 18, 2012; Mailing Date: Jan. 4, 2013 pp. 9.

*Primary Examiner* — Stephen W Jackson
*Assistant Examiner* — Christopher Clark
(74) *Attorney, Agent, or Firm* — Whitmyer IP Group LLC

(57) ABSTRACT

A DC circuit breaker including a pair of arcing contact members for holding an arc, an interaction element, adapted for interacting with the arc in dependence of whether the arc is in a first or second state such that the arc voltage drop in the first state is lower than the drop in the second state, a resonance branch coupled in parallel to the contact members thereby forming a resonance circuit adapted for letting a resonance branch current $I_r$ oscillate thereby inducing oscillations of an arc current $I_a$, wherein the resonance branch includes a coupling element for coupling the resonance branch with the arc, such that the arc is brought to the first state when the current $I_r$ in the resonance branch has a first direction, and that the arc is brought to the second state when the current $I_r$ in the resonance branch has a second direction.

19 Claims, 4 Drawing Sheets

(51) Int. Cl.
  *H01H 33/59*  (2006.01)
  *H01H 33/664*  (2006.01)
  *H02H 1/00*  (2006.01)
  *H02H 1/06*  (2006.01)

(52) U.S. Cl.
  CPC ...... *H01H 33/6641* (2013.01); *H02H 1/0015* (2013.01); *H02H 1/063* (2013.01)

(58) Field of Classification Search
  USPC .......................................................... 361/8
  See application file for complete search history.

(56) References Cited

U.S. PATENT DOCUMENTS

| | | |
|---|---|---|
| 4,376,271 A | 3/1983 | Gallatin et al. |
| 5,402,297 A * | 3/1995 | Ouchi ................. H01H 33/596 361/1 |
| 8,502,102 B2 * | 8/2013 | Eriksson ................. H01H 9/40 218/149 |

* cited by examiner

PASSIVE RESONANCE DC CIRCUIT BREAKER

FIELD OF THE INVENTION

Aspects of the invention relate to a circuit breaker, especially to a DC circuit breaker, and to a method for interrupting a current, especially a method for interrupting a DC current. Further aspects relate to a use of such a DC circuit breaker for performing such a method for interrupting a DC current.

BACKGROUND OF THE INVENTION

Electrical circuits need to be protected in a fault situation. Typical fault situations include overload or short circuit resulting in overcurrents or excess currents, i.e. when a larger than intended electric current flows in a circuit. In an overcurrent situation, excessive heat is generated in a conductor, which might result in circuit damage or even fire. In order to protect electrical circuits in a fault situation described above, circuit breakers can be utilized. A basic function of a circuit breaker is to interrupt electrical current by breaking or disconnecting the circuit immediately after a fault condition has been detected.

Circuit breakers can be provided as mechanical switches. These switches typically have at least two contact members which are initially pressed against each other and conduct the current in normal operation. In case of a fault, due to the overcurrent, the contact members and/or insulating gas surrounding the contact members is or are heated up, until the material of the contact members and/or of the surrounding gas is ionized and becomes conductive, i.e. reaches a plasma state. When a mechanism which separates the two contact members of the switch is triggered, the separation of the contact members does not interrupt the flow of current immediately, since the current continues to flow through a gap within the plasma medium. Thereby, an electric arc is created. The arc can only be sustained, if the current, and with it the electric heating of the plasma, is sufficiently high. This is typically the case for fault current conditions.

In order to interrupt the flow of current, the arc must be extinguished. This can be achieved by decreasing the current and with it the heating power below a certain threshold, below which the heating is not sufficient to sustain the arc. The plasma cools down and loses its conductivity. Such a situation can typically only be reached around a current zero crossing of the current, as with vanishing current the heating of the plasma disappears, as well. Hence, conventional AC circuit breakers are switching off the current at a zero crossing.

In general, interrupting DC currents (direct currents) is difficult compared to interrupting AC currents (alternating currents). This is caused by the lack of natural current zero crossings in a DC case as opposed to an AC case. Therefore, a DC circuit breaker has to create first a zero crossing and then to interrupt at current zero. The standard solution today for voltages up to about 1.5 kV makes use of an arc chute building up typically twice the grid voltage. This counter voltage to the grid voltage drives the current towards zero, where the arc can be extinguished. However, the minimal arc chute voltage needed is larger than the grid voltage. Hence, this concept is limited to low voltages, because otherwise the number of splitter plates needed for building up enough voltage becomes too large.

As an alternative, a concept based on a passive resonance circuit can be used. FIG. 1 depicts a DC circuit breaker 110, wherein an LC-circuit branch 130, comprising an inductor 132 and a capacitor 134, is connected in parallel to arc contact members 120a, 120b. 112 represents a grid resistance $R_g$ and 114 a grid impedance $L_g$. 116 is a residual breaker.

FIG. 2 shows the currents as a function of time, wherein $I_g$ is the grid current, e.g. the current flowing through $L_g$, $I_r$ is the resonance branch current, i.e. the current flowing in the resonance branch 130, and $I_a$ is the arc current, i.e. the current flowing in the arc 122, wherein $I_a = I_g - I_r$.

Before a fault (at times $t < t_f$, with $t_f$=fault time), all current flows through the closed contact members 120a, 120b. After the fault ($t_f < t < t_{cs}$, with $t_{cs}$=time of contact separation), the current starts to rise linearly (limited by the grid impedance $L_g$). As soon as the arc contact members 120a, 120b separate (at contact separation time $t_{cs}$), an arc 122 is formed.

After the contact separation ($t > t_{cs}$), due to an arc voltage, some of the current is diverted into the resonance branch 130, where the resonance branch current $I_r$ starts to flow, to increase and to charge the capacitor 134. Once the capacitor 134 is charged to the voltage of the arc, the resonance branch current $I_r$ starts to decrease. $I_r$ cannot disappear immediately due to the inductance L of the inductor 132. Once the resonance branch current $I_r$ reaches zero, the capacitor 134 is charged to about twice the arc voltage. Hence, the resonance branch current $I_r$ starts to flow into the opposite direction and to increase in absolute value. The arc current $I_a$ then increases, as well.

Due to the negative arc characteristics (i.e. low arc current leads to high arc voltage and vice versa high arc current leads to low arc voltage), the arc voltage is lower at high values of the arc current $I_a$. Hence, the capacitor 134 discharges to a low voltage. The resonance branch current $I_r$ reaches its minimum when the capacitor 134 is discharged. Afterwards, the resonance branch current $I_r$ rises again, while the capacitor 134 is discharged further to negative voltages.

This cycle of charging the capacitor 134 with higher arc voltage then discharging it with lower arc voltage, continues and causes oscillations of the resonance branch current $I_r$, the arc current $I_a$ and the capacitor voltage with ever increasing amplitudes.

As soon as the arc current $I_a$ passes zero ($t = t_z$ with $t_z$=time of current zero crossing), the arc 122 can be extinguished.

The object of the present invention is to provide an improved DC circuit breaker for more effective, fast and reliable interrupting of currents.

SUMMARY OF THE INVENTION

In view of the above, according to the independent claims, a DC circuit breaker, a method for interrupting a DC current and a use of the DC circuit breaker performing the method of interrupting a DC current are provided.

According to an aspect, a DC circuit breaker is provided. The DC circuit breaker comprises a pair of arcing contact members for holding an arc; an interaction element, adapted for interacting with the arc in dependence of whether the arc is in a first state or in a second state such that due to the interaction element the arc voltage drop in the first state is lower than the arc voltage drop in the second state; a resonance branch coupled in parallel to the contact members thereby forming a resonance circuit adapted for letting a resonance branch current oscillate thereby inducing oscillations of an arc current, wherein the resonance branch comprises a coupling element for coupling the resonance branch with the arc, such that the arc is brought to the first state when the current in the resonance branch has a first direction, and that the arc is brought to the second state when the current in the resonance branch has a second direction.

An advantage is reliable and fast amplification of current oscillations. Hence, time needed to cross the current zero is reduced and thereby extinguishing the arc and breaking the circuit is made possible reliably and in a short period of time after a fault has occurred.

According to a further aspect, a method for interrupting a DC current is provided. The method includes forming an arc between said arcing contact members; inducing current oscillations in a resonance circuit comprising a resonance branch and the arcing contact members; inducing a magnetic field by a coupling element of the resonance branch, the magnetic field depending on the resonance branch current; bringing the arc to a first state by the magnetic field when a current in the resonance branch has a first direction; bringing the arc to a second state by the magnetic field when the current in the resonance branch has a second direction; interacting by an interaction element with the arc in dependence of whether the arc is in the first state or in a second state such that due to the interaction element the arc voltage drop in the first state is lower than the arc voltage drop in the second state.

Embodiments are also directed to a use of such a DC circuit breaker for performing such a method for interrupting a DC current.

Further advantages, features, aspects and details that can be combined with embodiments described herein are evident from the dependent claims, the description and the drawings.

BRIEF DESCRIPTION OF THE DRAWINGS

The details will be described in the following with reference to the figures, wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or similar components. Generally, only the differences with respect to the individual embodiments are described. Unless specified otherwise, the description of a part or aspect in one embodiment applies to a corresponding part or aspect in another embodiment, as well.

While the foregoing is directed to embodiments, other and further embodiments may be devised without departing from the basic scope determined by the claims.

Figure 1:
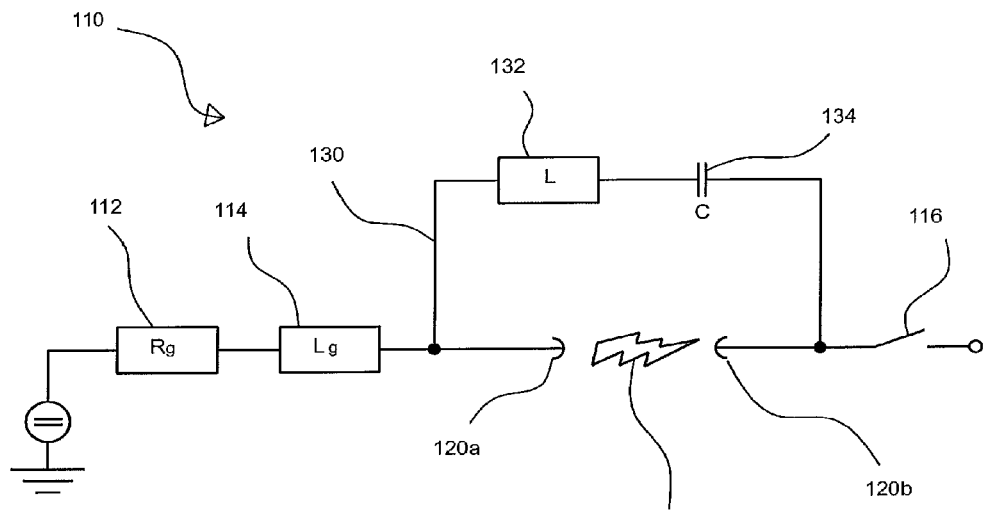
FIG. 1 is a schematic view of a conventional passive resonance DC circuit breaker.
Figure 2:
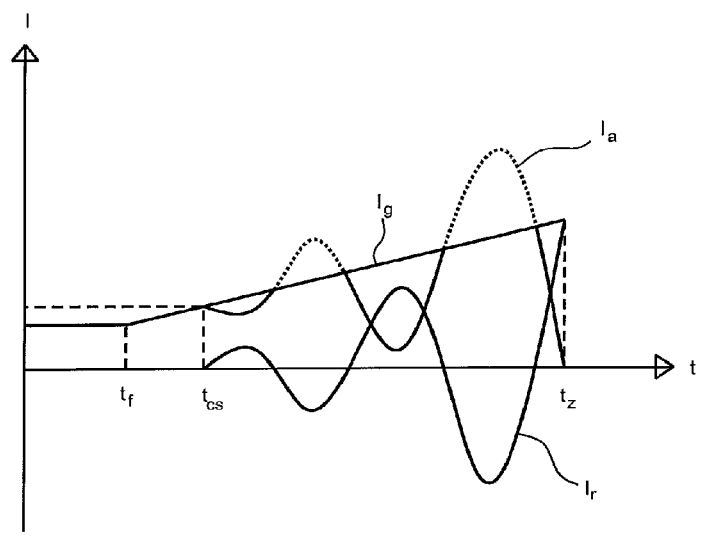
FIG. 2 is a diagram of currents as a function of time in a conventional passive resonance DC circuit breaker of FIG. 1.
Figure 3:
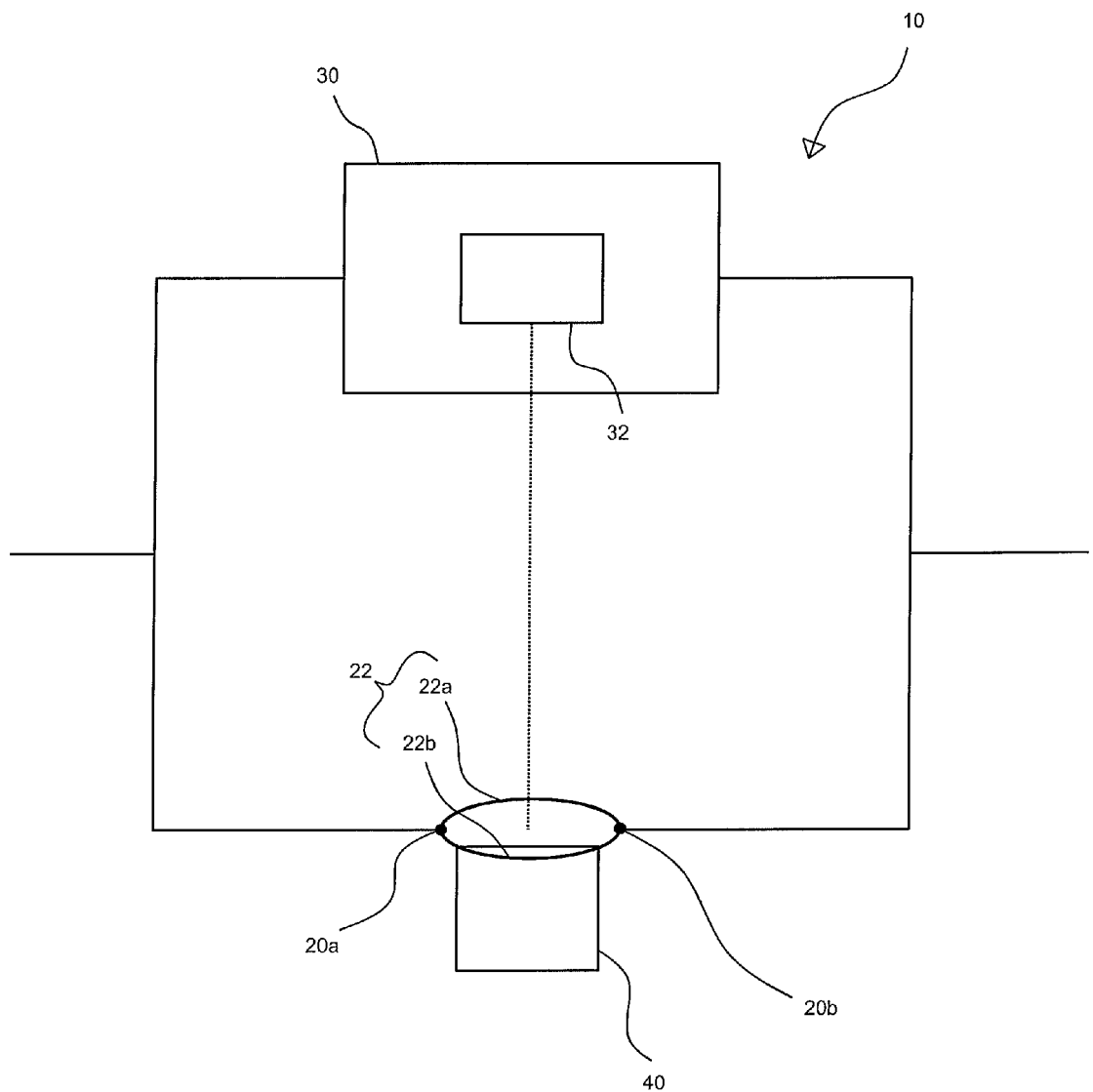
FIG. 3 is a block diagram of the DC circuit breaker according to the invention.

FIG. 3 shows a DC circuit breaker 10 according to the present invention. The DC circuit breaker 10 comprises a pair of arcing contact members 20a, 20b, an interaction element 40 and a resonance branch 30. The arcing contact members 20a, 20b (movable or non-movable) are adapted for holding an arc 22, which occurs while breaking the circuit by the DC circuit breaker, e.g. when separating the contact members 20a and 20b from each other.

As shown in FIG. 3, the arc 22 can be (or can be brought) in two states: arc 22a in a first state, arc 22b in a second state. A state of the arc 22 can be characterized for example by a shape of the arc 22, i.e. the arc 22 can have a first shape in the first state and a second shape (different from the first shape) in the second state. A state of the arc can also be characterized by a location of the arc 22.

The interaction element 40 is adapted to interact with the arc 22. The intensity of this interaction depends on whether the arc 22 is in the first state 22a or in the second state 22b. Due to the interaction element 40, i.e. as a result of the interaction between the interaction element 40 and the arc 22, the arc voltage drop in the first state 22a is different from (e.g. lower than) the arc voltage drop in the second state 22b. Even if there may be other causes for a difference in arc voltage drop between the two states, a substantial portion of the difference should be caused by the interaction element. Thus, if the interaction element is removed, there may be a (small) residual difference in arc voltage drop, but the main difference in arc voltage drop, i.e. more than 50%, should disappear. The interaction element 40 is different from the contact members 20a, 20b, and is preferably on an electrical potential different from that of the arc contact members 20a, 20b, and it may, e.g., be on a floating potential.

The resonance branch 30 is coupled in parallel to the contact members 20a, 20b. The resonance branch 30 and the contact members 20a, 20b form together a resonance circuit adapted for letting the resonance branch current oscillate. The oscillating resonance branch current induces oscillations of the arc current, whereby the arc current is superimposed by the resonance branch current, such that e.g. the resonance branch current plus (or minus) the arc current equals an incoming current, i.e. a current entering the DC circuit breaker, e.g. a grid current. The resonance branch 30 can be an LC branch having an inductor and a capacitor.

The resonance branch 30 comprises a coupling element 32. The coupling element 32 couples (dotted line in FIG. 3) the resonance branch 30 with the arc 22, such that due to this coupling (as a result of this coupling), the arc 22 is brought to the first state 22a when the current in the resonance branch 30 has a first direction, and that the arc is brought to the second state 22b when the current in the resonance branch 30 has a second direction. This does not necessarily imply that the arc 22 is always brought to the respective state 22a when the current in the resonance branch has the respective direction, but there may be additional conditions, e.g. that the current magnitude is above a given threshold. Also, the term "state" may describe a whole set of different micro-configurations which do not necessarily all have the same arc voltage drop. In such a case, the arc voltage drop can be determined as a time-average. Also, the bringing to the state may take some time, and may not be effected immediately after the current has switched sign. In this case, the arc voltage drop is obtained only after some time of a transition phase has passed.

Also, there may be other contributions to an arc voltage drop, other than the contribution from the interaction element 40. It is preferred that at least a sizeable contribution to the voltage drop difference between first and second state is due to the interaction element, e.g. at least 30% of the voltage drop difference, preferably at least 50% or even more preferred at least 70% of the voltage drop difference. An advantage is reliable and fast amplification of current oscillations. Hence, time needed to cross the current zero is reduced and thereby extinguishing the arc and breaking the circuit is made possible reliably and in a short period of time after a fault.

In the following, some further optional details of the embodiment of FIG. 3 are mentioned. These details may also apply to any other embodiment.

The coupling can be implemented by a force acting on the arc and pushing it to the first and to the second states, respectively. This force can depend on the resonance branch current. An example for the coupling element is a magnetic coil inducing a magnetic field, which exerts a Lorentz force on the arc.

According to a further aspect, the coupling element 32 of the resonance branch 30 is a coil adapted for inducing a magnetic field in a region of the arc for coupling with the arc. The coil can be an inductor of an LC branch. The coil can be wound on top of the contact members. The coil can be a pair of Helmholtz coils on both sides of the contact members. Also, a further coil can be connected in series with the Helmholtz coil.

According to a further aspect, a coil axis is substantially perpendicular to an axis defined by the contact members or to an axis along an extension of the arc.

According to a further aspect, the resonance branch 30 further comprises a capacitor. The resonance branch 30 can also include an inductor.

According to a further aspect, the interaction element 40 comprises at least one arc splitting element. The arc splitting elements can be splitter plates, arranged e.g. parallel to each other and oriented e.g. perpendicular to the arc, or to the axis defined by the contact members 20a, 20b.

According to a further aspect, the interaction element 40 is an ablating element such as an ablating wall. The ablating wall can be arranged next to the contact members and can be oriented e.g. parallel to the axis defined by the contact members 20a, 20b.

According to a further aspect, in the first state 22a the arc is located in a first position and in the second state 22b the arc is located in a second position, closer to the interaction element 40 than in the first position. Optionally, in the second position the arc can be in direct contact with the interaction element. While the arc can be in the first location or in the second location, roots of the arc (on the arcing contact members 20a, 20b) can be fixed to their positions, wherein only an arc column portion changes its location.

The arc voltage drop in the first state 22a is typically in the range of 20 V-100 V, more typically in the range of 40 V-60 V. The arc voltage drop in the second state 22b typically differs from the arc voltage in the first state 22a by at least a factor of 1.5 for currents larger than 2 times the nominal current.

According to a further aspect, the arc voltage drop in the first state 22a is less than half of the arc voltage drop in the second state 22b. The arc voltage drop in the second state 22b can be 1.5 times higher than the arc voltage drop in the first state 22a. The arc voltage drop in the second state 22b is typically ten times higher than the arc voltage drop in the first state 22a, for the arc current being larger than 10 times the nominal current.

According to a further aspect, the interaction between the interaction element 40 and the arc 22 includes cooling of the arc 22. The cooling can be realized by the interaction element 40.

According to a further aspect, due to the interaction element, the arc 22 has a first shape in the first state 22a and a second shape, different from the first shape, in the second state 22b, wherein the first shape has a first cross section and/or a first length and the second shape has a second cross section and/or a second length (different from the first cross section and/or the first length).

According to a further aspect, at least one root of the arc 22 moves by at least 1 mm when the arc 22 moves between the first state 22a and the second state 22b. Also, the arc 22 can move by at least 5 mm.

According to a further aspect, the arcing contact members 20a, 20b are adapted for holding the arc 22. Thus, the arcing contact members 20a, 20b may be made of any material which is sufficiently arc resistant such that the arc 22 can be formed and sustained by these arcing contact members without destruction of the arcing contact members 20a, 20b, during the intended lifetime of the interrupter or DC circuit breaker 10. Also, the arcing contact members 20a, 20b may be arranged and shaped such that the arc 22 is held between these contact members 20a, 20b when the DC current is being interrupted by the interrupter 10.

In a further embodiment, an additional pair of contacts is provided, which are separable from each other and are designed such that the arc occurs between the additional contacts, and then the arc can be commutated to the arcing contact members.

According to a further aspect, the method for interrupting a DC current includes:

forming an arc 22 between arcing contact members 20a, 20b, e.g. by separating the pair of arcing contact members 20a, 20b from each other or by separating other contact members and commuting the arc 22 to the arcing contact members 20a, 20b;

inducing current oscillations in a resonance circuit comprising a resonance branch 30 and the arcing contact members 20a, 20b;

inducing a magnetic field by a coupling element 32 of the resonance branch 30, the magnetic field depending on the resonance branch current $I_r$;

bringing the arc 22 to a first state 22a by the magnetic field when a current in the resonance branch 30 has a first direction;

bringing the arc 22 to a second state 22b by the magnetic field when the current in the resonance branch 30 has a second direction;

interacting by an interaction element 40 with the arc 22 in dependence of whether the arc 22 is in the first state 22a or in a second state 22b such that due to the interaction element 40 the arc voltage drop in the first state 22a is lower than the arc voltage drop in the second state 22b.

According to a further method, the DC circuit breaker of FIG. 3 or any other circuit breaker described herein is used for this method.

According to a further aspect, the method for interrupting a DC current further includes superimposing the resonance branch current $I_r$ on an arc current $I_a$ such that the arc current $I_a$ oscillates due to the oscillations of the resonance branch current $I_r$.

According to a further aspect, the method for interrupting a DC current further includes increasing an amplitude of oscillations so that the arc current $I_a$ becomes zero.

According to a further aspect, the use of the DC circuit breaker for performing the method for interrupting a DC current is provided.

Figure 4:
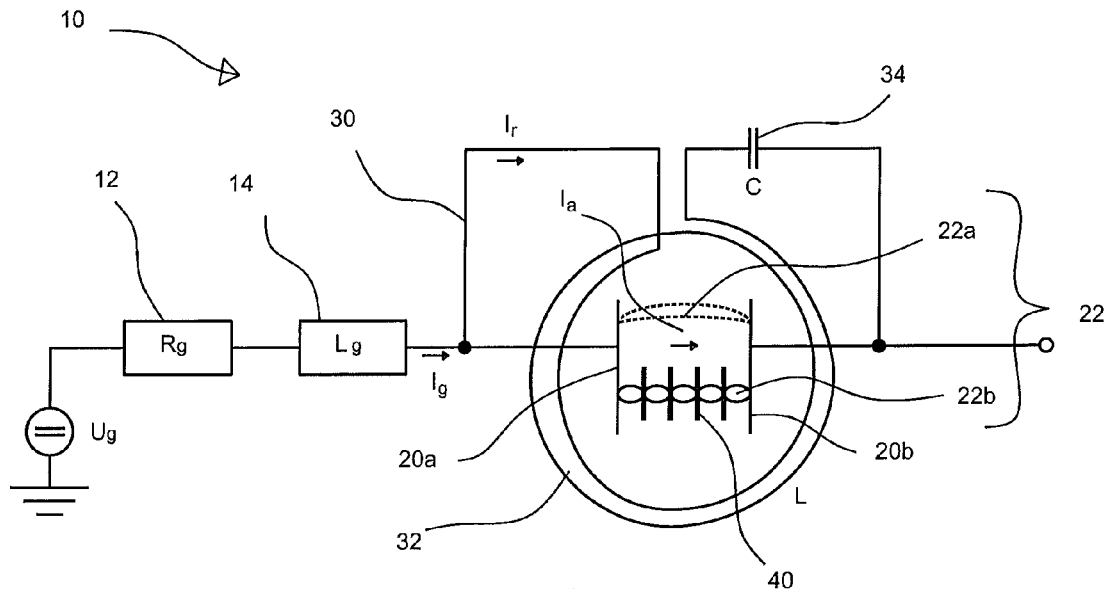
FIG. 4 is a schematic view of the DC circuit breaker according to an embodiment of the invention.

FIG. 4 is a schematic view of the DC circuit breaker according to an embodiment of the invention. In FIG. 4 same reference signs are used as in FIG. 3 for corresponding elements. The description of FIG. 3 also applies to FIG. 4.

The DC circuit breaker 10 comprises a pair of arcing contact members 20a, 20b, an interaction element 40 and a resonance branch 30. 12 represents a grid resistance $R_g$ and 14 a grid impedance $L_g$. The arcing contact members 20a, 20b are adapted for holding an arc 22a, 22b, which occurs during separating the contact members 20a and 20b from each other while breaking the circuit by the DC circuit breaker 10.

The interaction element 40 is formed as an arc splitter 40 and is provided to interact with the arc 22. The intensity of this interaction depends on whether the arc 22 is in a first state 22a or in a second state 22b. Due to the splitter 40 the arc voltage drop in the first state 22a is lower than the arc voltage drop in the second state 22b.

The resonance branch 30 is formed by a capacitor 34 and a coupling element 32, which is formed as a coil 32 and is wound around the contact members 20a, 20b. The coil 32 can also e.g. be a Helmholtz coil. The resonance branch 30 is coupled in parallel to the contact members 20a, 20b to form together with them a resonance circuit 30 adapted for letting the resonance branch current $I_r$ oscillate.

The resonance branch current $I_r$ flowing through the coil 32 induces a magnetic field in the region of the arc 22. The magnetic field in the arc region is pointing out of the plane of the drawing when the resonance branch current $I_r$ is positive, and is pointing down the plane of the drawing when the resonance branch current $I_r$ is negative. The magnetic field induced by the coil 32 couples with the arc 22 through the Lorentz force acting on the charged particles of the arc 22. The Lorentz force pushes the arc 22 downwards, into the splitter 40 (the second state 22b), when the resonance branch current $I_r$ is positive, and the Lorentz force pushes the arc upwards, out of the splitter 40 (the first state 22a), when the resonance branch current $I_r$ is negative.

Thus, the coupling element, formed as a coil 32, couples the resonance branch 30 with the arc 22, such that the arc 22 is brought to the first state 22a when the current in the resonance branch 30 has a first direction, and that the arc 22 is brought to the second state 22b when the current in the resonance branch 30 has a second direction.

Figure 5:
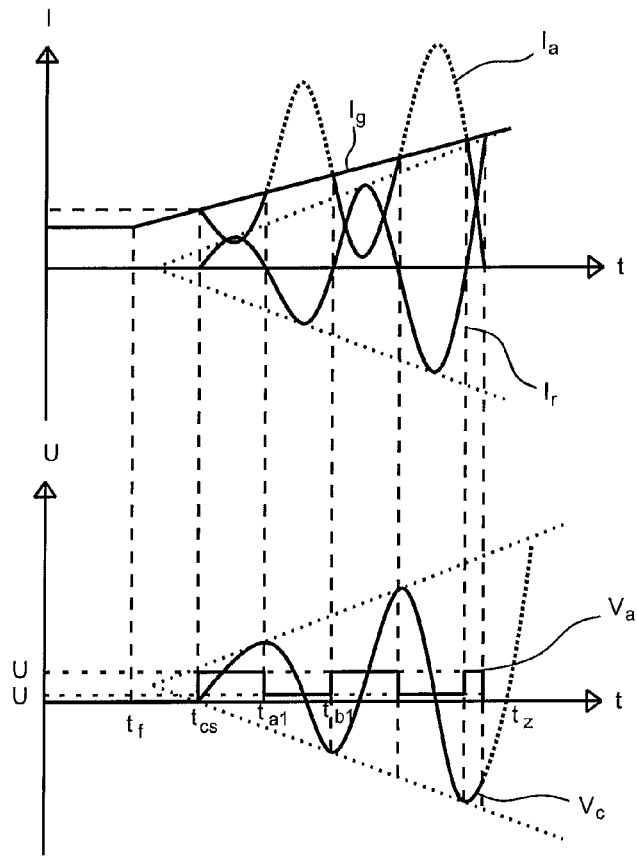
FIG. 5 shows diagrams of currents and voltages as a function of time in the DC circuit breaker of FIG. 4.

FIG. 5 shows the currents I and voltages U as a function of time t, wherein in the currents diagram (upper diagram), $I_g$ is the grid current, e.g. the current flowing through $L_g$, $I_r$ is the resonance branch current, i.e. the current flowing in the resonance branch 30, and $I_a$ is the arc current, i.e. the current flowing in the arc 22 ($I_g$, $I_r$ and $I_a$ are as shown in FIG. 4), wherein $I_a=I_g-I_r$. In the voltages diagram (lower diagram), $V_c$ is the capacitor voltage of the capacitor 34, and $V_a$ is the arc voltage of the arc 22. FIG. 5 shows an ideal case, in which the arc voltage $V_a$ jumps between two values, corresponding to the arc voltages in the first state 22a and the second state 22b. In reality the arc voltage $V_a$ is smoother, it may need some time to change between the two values, and may additionally depend on the arc current $I_a$. Nevertheless, the effect described herein is obtained as long as the arc 22 is brought to the first state 22a and the second state 22b in dependence of the current direction (possibly after some time lag), and as long as due to the interaction element 40, the arc voltage drop in the first state 22a is lower than the arc voltage drop in the second state 22b (even if there is additional voltage change due to other influences such as current magnitude). A rectangular voltage drop curve, as shown in FIG. 5, is not a prerequisite; instead the curve may also be smooth.

Before a fault ($t<t_f$), all current flows through the closed contact members 20a, 20b. After the fault ($t_f<t<t_{cs}$), the grid current $I_g$ starts to rise. This rise is limited by e.g. the grid impedance $L_g$. In FIG. 5 the rise is shown linear for simplicity. At $t=t_{cs}$ the DC circuit breaker separates the contact members 20a, 20b and the arc 22 is formed.

After the contact separation ($t>t_{cs}$), due to the arc voltage $V_a$ some of the current is diverted into the resonance branch 30, where the resonance branch current $I_r$ starts to flow, to increase and to charge the capacitor 34. Due to the Lorentz force exerted on the arc 22 by the magnetic field induced by the resonance branch current $I_r$ flowing through the coil 32, the arc 22 is pushed downwards into the splitter plates 40, to the second state 22b. The splitter plates 40 increase the arc voltage $V_a$ to a higher value, thus the capacitor 34 is charged with the high arc voltage. The resonance branch current $I_r$ starts to decrease, it cannot disappear immediately due to the inductance L of the coil 32, so the resonance branch current $I_r$ changes its sign (at $t=t_{a1}$) and starts to flow in the opposite direction.

When the resonance branch current $I_r$ starts to flow in the opposite direction and to increase in value, also the magnetic field and the Lorentz force change their signs and the Lorentz force pushes the arc upward out of the splitter plates 40, resulting in lower arc voltage, which corresponds to the first state 22a. Consequently, the capacitor 34 discharges to a low voltage. The resonance branch current $I_r$ reaches its minimum when the capacitor 34 is discharged. Afterwards, the resonance branch current $I_r$ rises (i.e. here is negative with decreasing value) again, while the capacitor 34 is discharged further to negative voltages. At $t=t_{b1}$ the resonance branch current $I_r$ changes its sign again and the cycle is repeated with increased amplitudes.

If the arc voltage $V_a$ were constant, the resonance branch current oscillation would just continue with a constant amplitude (neglecting damping due to Ohmic losses). This cycle of charging the capacitor 34 with higher arc voltage then discharging it with lower arc voltage, continues and causes oscillations of the resonance branch current $I_r$, the arc current $I_a$ and the capacitor voltage $V_c$ with ever increasing amplitudes. As soon as the arc current $I_a$ passes zero ($t=t_e$), the arc 22 can be extinguished. It can be made sure that no reignition of the arc 22 is possible after it is extinguished.

The grid current $I_g$, however, is far from zero at this moment. Due to the grid impedance $L_g$ this current cannot be interrupted immediately, but may be commutated to a varistor (not shown in FIG. 4) coupled in parallel with the resonance branch 30. Once the energy stored in the grid impedance is dissipated, the residual breaker (not shown in FIG. 4) interrupts the grid current $I_g$.

Figure 6A:
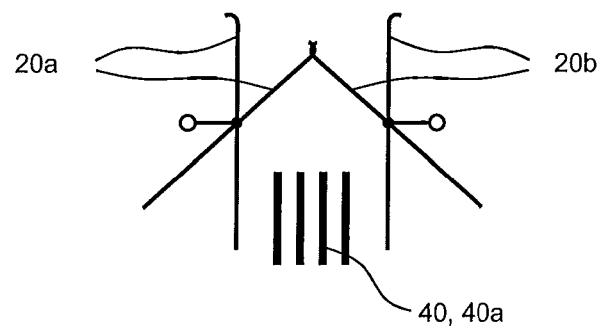
FIGS. 6a to 6c are schematic views of contact members and interaction elements of the DC circuit breaker according to embodiments of the invention.
Figure 6B:
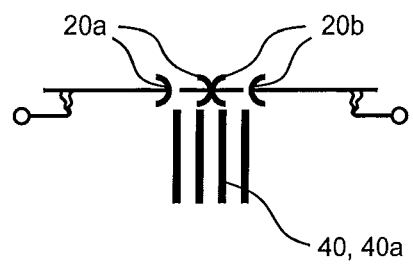
Figure 6C:
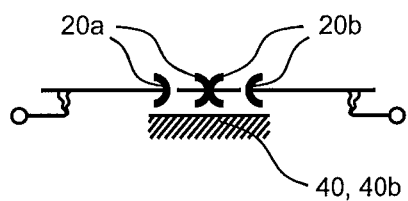

FIGS. 6a to 6c show various possible examples of the contact members and the interaction element for use in any embodiment of the present invention.

FIG. 6a shows a realization of contact members 20a, 20b being moving contact members for use e.g. in embodiment of FIG. 4. In the closed state the contact members 20a, 20b are tilted to an inverted V shape, such that the two contact members 20a, 20b are in contact with each other. In the open state the contacts 20a, 20b are parallelly spaced with a distance from each other. The contact members 20a, 20b are shaped e.g. as arc rails, allowing the arc root to move depending on the state of the arc. Correspondingly, the arc root, and thus the entire arc, moves up and down on the arc rails, and thereby moves into the interaction element 40, here e.g. splitter plates 40*a* (in the second state 22*b*), and out of the interaction element 40, here e.g. splitter plates 40*a* (in the first state 22*b*).

In an alternative embodiment, the respective arc rails are made of two or more parts which are movable relative to each other and are contacted separately. In this manner, only small masses need to be moved for separating the contact members from each other. In yet another alternative embodiment, the respective arc rails have a fixed position, and are arranged such that the arc is commuted to the arc rails during the current breaking operation.

FIG. 6*b* shows a further embodiment. Contact members 20*a*, 20*b* are linearly movable in horizontal direction. The arc is held between the contact members 20*a*, 20*b* all the time, such that the arc root is not displaced substantially. When the arc is pushed downwards by the magnetic field of the coil (the coupling element 32), the arc is bent and pressed against the interaction element 40, here e.g. splitter plates 40*a*, resulting in a high arc voltage (the second state 22*b*). As soon as the magnetic field changes sign, the arc starts to move upwards and is bent away from the interaction element 40, here e.g. splitter plates 40*a* (the first state 22*a*).

FIG. 6*c* shows a realization for varying the arc voltage through ablation. An interaction element 40, here e.g. an ablating wall 40*b*, is provided next to the contact members 20*a*, 20*b*. The distance between the arc and the ablating wall 40*b* is varied by the Lorentz force acting on the arc, such that due to the coupling element, the arc is brought closer to the ablating wall 40*b* (the second state 22*b*), when the resonance branch current $I_r$ has the second direction, and the arc is brought away from the ablating wall 40*b* (the first state 22*a*), when the resonance branch current $I_r$ has the first direction. The arc voltage is higher when the arc is closer to the ablating wall 40*b* (the second state 22*b*), and the arc voltage is lower when the arc is brought away from the ablating wall 40*b* (the first state 22*a*).

The interaction elements 40 of FIGS. 6*b* and 6*c*, i.e. the at least one splitter plate 40*a* and the at least one ablating wall 40*b*, can also be combined into one common interaction element 40 to increase the difference in the arc voltage between the first state 22*a* and the second state 22*b* of the arc 22.

What is claimed is:

1. A DC circuit breaker comprising:
a pair of arcing contact members for holding an arc;
an interaction element configured to interact with the arc in dependence of whether the arc is in a first state or in a second state such that due to the interaction element the arc voltage drop in the first state is lower than the arc voltage drop in the second state;
a resonance branch coupled in parallel to the contact members, the resonance branch and contact members forming a resonance circuit adapted to enable a resonance branch current to oscillate thereby inducing oscillations of an arc current, the resonance branch including
a coupling element configured to couple the resonance branch with the arc, such that the arc is brought to the first state when the current in the resonance branch has a first direction, and that the arc is brought to the second state when the current in the resonance branch has a second direction, wherein the coupling comprises a force acting on the arc and adjusting the arc between the first state that is further away from the interaction element and the second state that is closer to the interaction element.

2. The DC circuit breaker according to claim 1, wherein the coupling element is a coil adapted for inducing a magnetic field in a region of the arc for coupling with the arc.

3. The DC circuit breaker according to claim 2, wherein a coil axis is substantially perpendicular to an axis defined by the contact members.

4. The DC circuit breaker according to claim 1, wherein the resonance branch further comprises a capacitor.

5. The DC circuit breaker according to claim 1, wherein the interaction element comprises at least one arc splitting element.

6. The DC circuit breaker according to claim 1, wherein the interaction element is an ablating element.

7. The DC circuit breaker according to claim 1, wherein in the first state the arc is located in a first position and in the second state the arc is located in a second position, which is closer to the interaction element than in the first position.

8. The DC circuit breaker according to claim 1, wherein the arc voltage drop in the first state is less than half of the arc voltage drop in the second state.

9. The DC circuit breaker according to claim 1, wherein the interaction between the interaction element and the arc includes cooling of the arc.

10. The DC circuit breaker according to claim 1, wherein due to the interaction element the arc has a first shape in the first state and a second shape, different from the first shape, in the second state, wherein the first shape has a first cross section and/or a first length and the second shape has a second cross section and/or a second length.

11. The DC circuit breaker according to claim 1, wherein at least one root of the arc moves by at least 1 mm when the arc moves between the first state and the second state.

12. A method for interrupting a DC current, the method including:
forming an arc between a pair of arcing contact members;
inducing current oscillations in a resonance circuit comprising a resonance branch and the arcing contact members;
inducing a magnetic field by a coupling element of the resonance branch, the magnetic field depending on the resonance branch current;
bringing the arc to a first state by the magnetic field when a current in the resonance branch has a first direction;
bringing the arc to a second state by the magnetic field when the current in the resonance branch has a second direction;
interacting by an interaction element with the arc in dependence of whether the arc is in the first state or in a second state such that due to the interaction element the arc voltage drop in the first state is lower than the arc voltage drop in the second state;
wherein the magnetic field is configured to act on the arc and adjust the arc between the first state that is further away from the interaction element and the second state that is closer to the interaction element.

13. The method for interrupting a DC current according to claim 12, further including: superimposing the resonance branch current on an arc current such that the arc current oscillates due to the oscillations of the resonance branch current.

14. The method for interrupting a DC current according to claim 13, further including: increasing an amplitude of oscillations so that the arc current becomes zero.

15. The DC circuit breaker according to claim 6, wherein the ablating element is an ablating wall.

16. The DC circuit breaker according to claim 2, wherein the coil comprises one of a Helmholtz coil or a pair of Helmholtz coils on both sides of the contact members.

17. The DC circuit breaker according to claim 2, wherein the coil is wound on top of the contact members.

18. The DC circuit breaker according to claim 5, wherein the at least one arc splitting element comprises splitter plates arranged parallel to each other and oriented perpendicular to the arc or to an axis defined by the contact members.

19. The method for interrupting a DC current according to claim 12, wherein the coupling element is a coil adapted to induce the magnetic field in a region of the arc for coupling with the arc.

* * * * *